Figure 1:
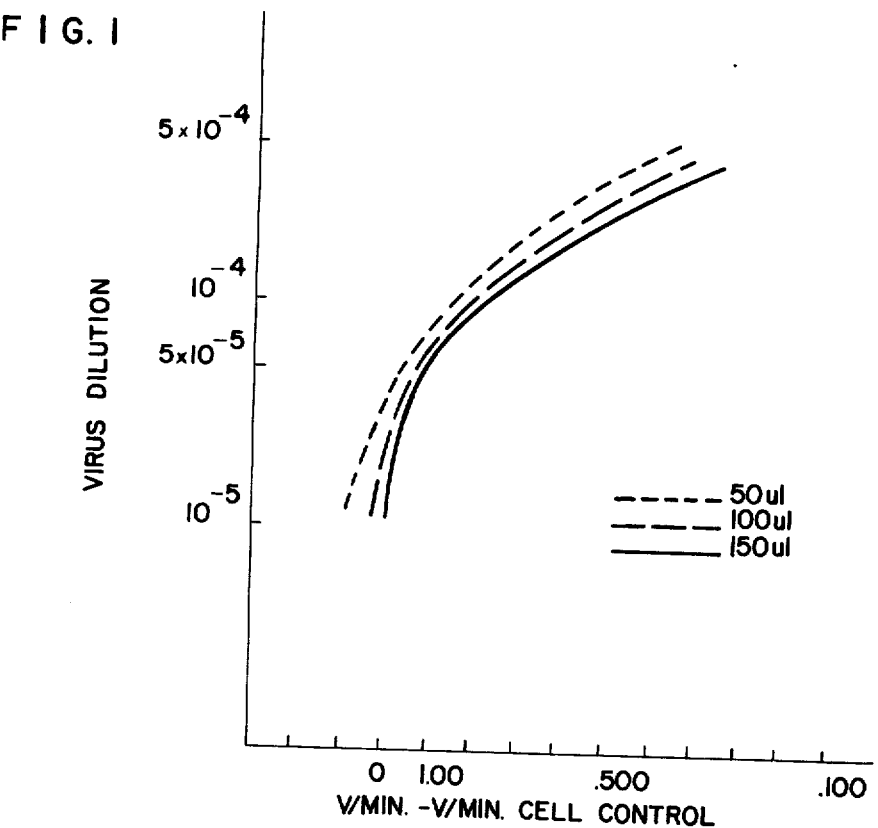

United States Patent [19]
Cartwright et al.

[11] 3,910,824
[45] Oct. 7, 1975

[54] INTERFERON ASSAY

[75] Inventors: Terrence Cartwright, Merton, England; Alan Asher Schwartz, Winnetka; William Roy Smith, Glenview, both of Ill.

[73] Assignee: G. D. Searle & Co., Chicago, Ill.

[22] Filed: Oct. 18, 1973

[21] Appl. No.: 407,749

[52] U.S. Cl. ............................ 195/103.5 R; 195/1.1
[51] Int. Cl. ............................................ G01n 31/14
[58] Field of Search ................ 195/103.5; 424/85

[56] References Cited
OTHER PUBLICATIONS

Blackman et al., *J. of Virology*, Vol. 4 (3), 203–208 (1969).

Finter, N. B. *Frontiers of Biology*, Vol. 2, "Interferon Assays and Standards," 87–103 (1966).

*Primary Examiner*—Alvin E. Tanenholtz
*Assistant Examiner*—Esther L. Massung
*Attorney, Agent, or Firm*—Elliot N. Schubert; John J. McDonnell

[57] ABSTRACT

The antiviral activity of agents such as interferon, adamantanamine and 1-$\beta$-D-ribofuranosyl-1,2,4-triazole-3-carboxamide is determined by measurement of the intracellular enzymes released upon viral infection.

5 Claims, 6 Drawing Figures

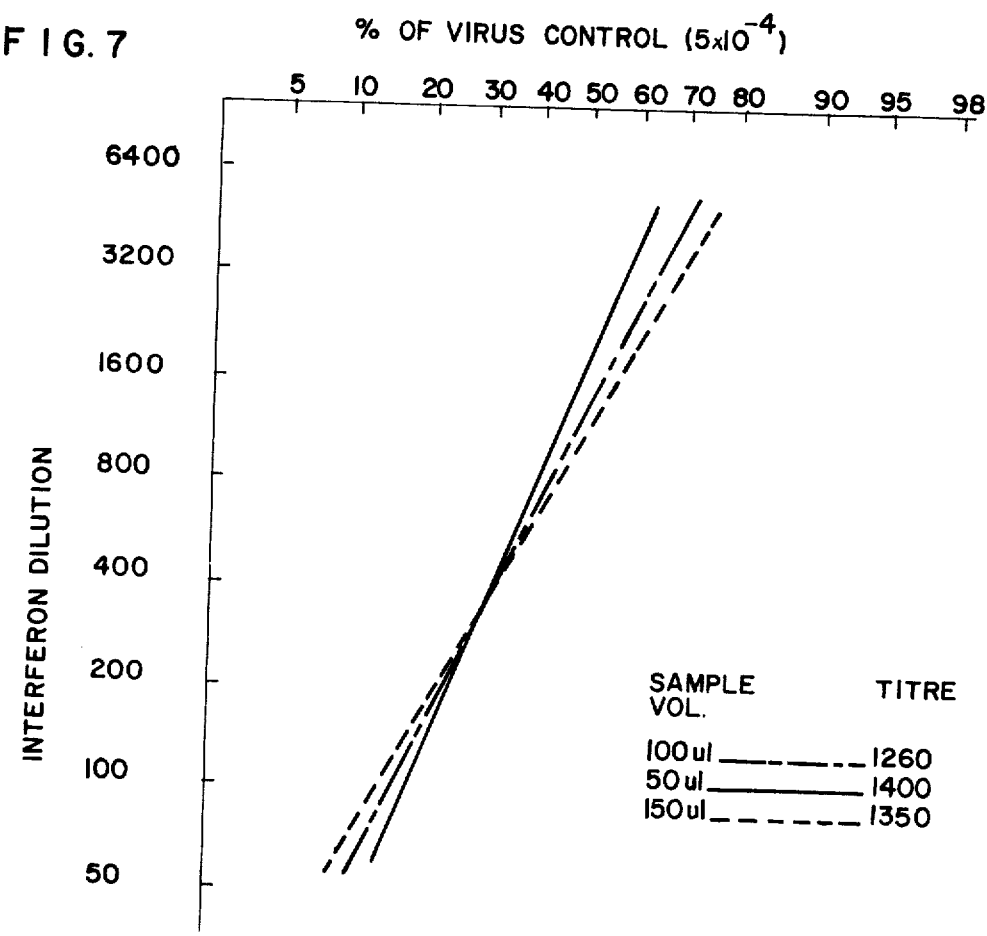

INTERFERON ASSAY

The present invention relates to a method of measuring the antiviral activity of compounds and natural substances, and in particular the antiviral activity of interferon.

Many substances, both natural and synthetic are manufactured commercially for their antiviral activity, and it is frequently required that this activity be routinely tested. The process of the present invention applies to the routine testing of the antiviral activity of interferon, but it is possible with only minor modification to apply the methods to the control of the manufacture of any antiviral agent, e.g. adamantanamine and 1-$\beta$-D-ribofuranosyl-1,2,4-triazole-3-carboxamide.

It is now possible to commercially manufacture interferon. There are various approaches to its production, utilizing the in vitro, bulk culture of human cells, the use of buffy coat suspensions or the use of living animals as agents for interferon production. Bulk culture methods can employ cell lines, cell strains or primary cells. In the case of one cell culture method, bulk cultures of certain human cells, e.g. lymphocytes, are stimulated to produce interferon which is released into the incubation medium. Similarly, buffy coat suspensions may be stimulated to produce and release interferon. The stimulating agent may be live virus, inactivated virus particles, viral nucleic acid, synthetic polynucleotides or certain chemical compounds. Sufficient stimulating agent is used to cause a maximum stimulation of the culture cells, after which the incubation medium is separated and the interferon isolated and purified. It is important, however, that maximum stimulation is achieved rapidly as the cells become insensitive to further or continued application of stimulating agents. In order to control this process for interferon manufacture it becomes necessary to monitor continuously and fairly rapidly the level of interferon in the incubation medium.

An alternative method of "manufacturing" interferon is to stimulate a whole animal to synthesize large quantities of interferon using stimulating agents similar to those described before.

The blood of the animal can then be collected and the interferon separated from the blood by physical and chemical means. For similar reasons to those described before, the maximum stimulation of interferon induction should be achieved rapidly. It is important, then, that the level of interferon should be measured in the blood of the animal.

A further instance in which the levels of interferon in blood may need to be measured is in the induction of interferon release or the administration of interferon as a means of combating viral infection. In order to monitor the course of the interferon therapy, it may be essential to determine the level of interferon in the patient's blood. However, when it is an interferon containing serum sample that is to be measured, allowance at low serum dilution must be made for the presence of serum enzymes which would give false results. Thus, a serum control must be used to provide the base line for comparison.

The present invention can therefore be used in the three examples given before, and other similar situations, to measure the antiviral activity of interferon. This is achieved by measuring the reduction, when interferon is added to the incubation medium, of the cell damage caused by viral infection of suitable cells in culture.

It is now possible to successfully grow virus particles in in vitro cultures of certain cell lines. Thus, following the infection of host cells by virus particles, there is a latent period during which the viral nucleic acid is replicating and the virus particles are being assembled. This is followed, usually, by the release of viral particles and, due to the attendant damage to the host cell membrane, certain host cell contents, into the incubation medium.

The antiviral activity of interferon may therefore be measured by the inhibition it causes of viral growth in cell cultures. Conventionally, this is measured by determining the decreased number of viral plaques or the reduced yield of virus from interferon treated relative to untreated virus-infected cell cultures. Alternatively, the viral growth in such assays is monitored by the damage caused to cell membranes of the host cells during the growth of virus particles. One method of monitoring the damage to cell membranes utilizes the ability of damaged cells, but not intact cells, to take up certain dyes. The amount of dye absorbed by a sample of the culture is then an indication of the number of damaged cells present and so of the viral growth. An alternative method relies upon the fact that the release of absorbed $^{51}Cr$ from damaged cells is more rapid than the release from intact cells. Both of these methods require that the cells be washed extensively before the dye remaining in them is analysed or those cells containing $^{51}Cr$ are reincubated. Consequently, the procedures are complicated and very exacting.

Recently, it has been demonstrated that a result of the disruption of cell membranes by viral infection is the release of intracellular proteins, including enzymes, into the incubation medium. The extent of enzyme release can then be used as an indication of the extent of viral growth. This method does not rely upon the addition of any factors to the cells. The degree of cell damage is measured by the release of intracellular enzymes into the incubation medium. Many enzymes contained in the intact cells are released only slowly or not at all, whereas when the cell is moribund, they are released as free, soluble enzymes in the incubation media. They can then be measured by simple and well known enzyme assays, in untreated samples of the incubation medium.

In the above procedure the only requirement for the selection of the cell lines, cell strains or primary cells is that they are a suitable host for the virus used and that they are sensitive to interferon. The virus used should not be an interferon inducer in the chosen host cells. Although the dilution or virus applied to the cells is critical, the range varies depending on the host-virus couple selected. The enzymes released which are to be measured can be any enzyme not normally released in the absence of injury. Examples of enzymes found in many cells which meet this criteria are: glutaric-oxaloacetic transaminase; lactic dehydrogenase; glutamic-pyruvate transaminase; alkaline phosphatase, creatine phosphokinase, phosphofructokinase, DPN (diphosphopyridine nucleotide) or DPNH dependent enzymes, aldolase; proteolytic enzymes; nucleases; or leucine aminopeptidase.

It is, therefore, the purpose of the present invention to assay the antiviral activity of interferon, by measuring the reduction in cell damage, caused by viral infection, in the presence of interferon. It is the particular feature of the present invention that the extent of cell damage is indicated by measuring the release of intracellular enzymes, of the host cells, into the incubation medium.

For example, for the assay of human interferon, human cells are grown in monolayer culture in the presence or absence of interferon. The culture is infected with a suitable virus and the progress of viral infection is followed by measuring the release of intracellular enzymes into the incubation medium. The ability of the interferon to protect the culture cells against the viral infection is then a measure of its antiviral activity. The practice of the present invention in this way has the particular advantage that the assays of interferon can be carried out quickly and simply, without the long washing procedures required by existing methods.

Accordingly, the present invention relates to a novel method of assaying the antiviral activity of compounds and natural substances whereby their antiviral activity is measured by the extend to which they inhibit the growth of virus particles in tissue culture cells and in which the release of culture cell intracellular enzymes into the incubation medium is used as an indication of viral growth.

In order to perform the assay for the amount of intracellular enzymes released when employing this invention, it is necessary first to determine the dilution of virus to use with the host cells. The following example illustrates how this was determined for one virus-hots couple. Similar experiments were performed to determine the dilution range for other virus-host couples.

Vesicular Stomatitis Virus (VSV) Titration

For each dilution of a standard stock of virus given below the volume/well of virus was 50, 100 and 150 µl. After incubating the virus for 1 hour at 37°C, the virus was removed by suction and all wells refilled with 50 µl. of media. Samples were tested 25 hours after the virus was taken off. The host cells were primary Rhesus monkey kidney cells. The enzyme which was assayed was lactic dehydrogenase (LDH) at 340 mµ. The Calbiochem LDH-Ⓟ reagent was used to measure enzyme release with results given as rate of voltage change in the output of a spectrophotometer.

| | Average (millivolts/min. − millivolts/min. of the cell control) - in linear portion of the enzyme kinetic curve. | | | | |
|---|---|---|---|---|---|
| | $10^{-5}$ | $5\times10^{-5}$ | $10^{-4}$ | $5\times10^{-4}$ | cell control |
| 50 µl. | −106 | 42 | 117 | 620 | 258 |
| 100 µl. | − 4 | 58 | 172 | 709 | 226 |
| 150 µl. | − 38 | 36 | 194 | 779 | 231 |

These results are shown in FIG. 1.

It is thus apparent that the measurement of the activity of the antiviral agent, e.g. interferon, requires the use of a composition consisting of a suitable host cell-virus couple and a means for measuring the intracellular enzymes released.

The invention will appear more fully from the examples which follow. These examples are not to be construed as limiting the invention either in spirit or in scope since many modifications in materials and methods will be apparent to one skilled in the art.

EXAMPLE 1

Samples of human interferon are assayed by their ability to prevent the disruption of human amnion (Wish) cells by infection with Semliki Forest Virus (SFV). The destruction of Wish Cells is indicated by the release of glutaric-oxaloacetic transaminase (GOT) into the incubation medium.

Wish cells were allowed to grow in multiwell plates for 24 hours, during which time satisfactory cell growth was established. Interferon was added to certain cells in the plate at different dilutions. Standard interferon samples were added to other wells and some samples were left as blanks. The plates were incubated for between 2 and 24 hours after which time various amounts of virus were added to the wells. The plates were incubated for a further 24 hours to allow the viral infection of the cells to proceed. The levels of GOT in the cell incubation fluid were then measured using the following standard technique.

GOT was assayed using a commercial semimicro assay kit. However, any suitable small-scale method could be used. The present method offers the advantages of being rapid and sensitive. Thus, 0.04 ml. of the cell supernatant was added to 0.2 ml. of a mixture containing 0.1 M, pH 7.4 phosphate buffer, 0.1 M L-aspartate and 2 mM oxoglutarate. The enzyme reaction was left for one hour, after which time 0.2 ml. of 1 mM 2,4-dinitrophenylhydrazine was added, followed 5 minutes later by 2.0 ml. 0.4 M sodium hydroxide. The optical density of the resulting solution was measured in a spectrophotometer at 546 mµ.

Figure 2:
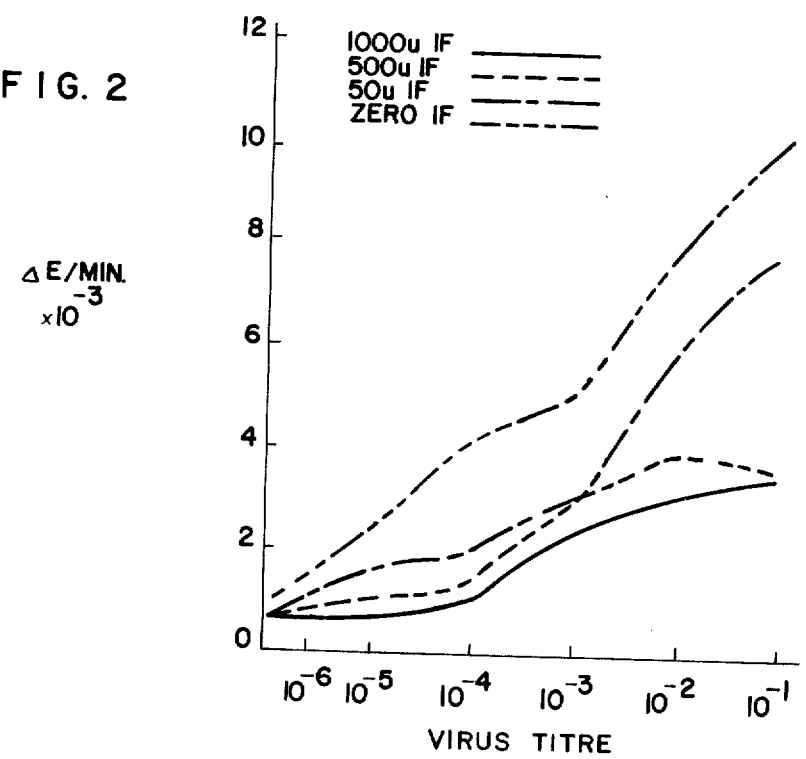

FIG. 2 illustrates the ability of interferon to protect cells against viral infection at increasing interferon titres and increasing virus titres. The GOT released as a result of viral infection is expressed as the change in optical density when the GOT is assayed by the above method. Thus, viral infection, as measured by the release of GOT from infected cells, is progressively reduced in the presence of increasing quantities of interferon.

Figure 3:
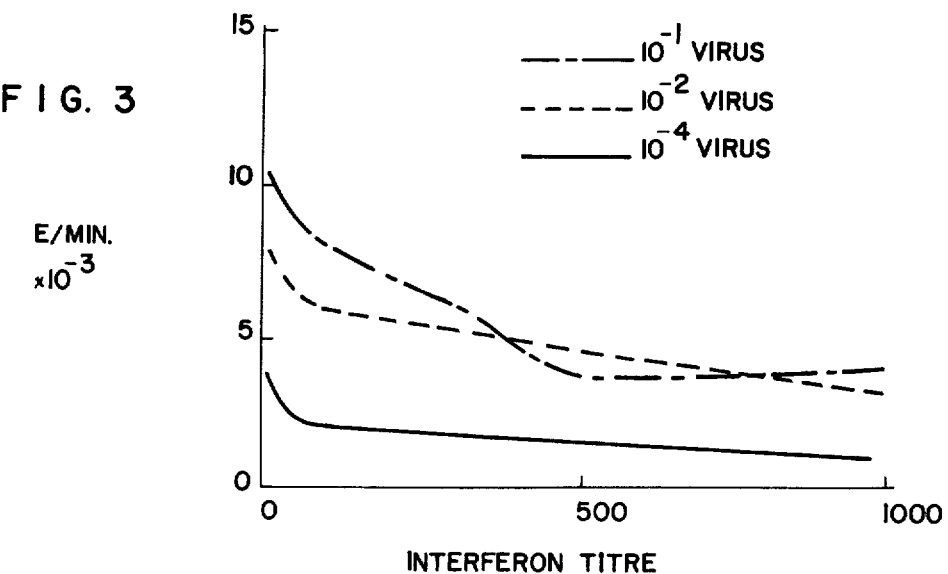

In FIG. 3, the results of FIG. 2 have been expressed to illustrate the effect of adding increasing quantities of interferon. As the interferon titre is increased, the release of enzyme, which is an indication of viral infection, is decreased.

EXAMPLE 2

The exact interferon activity of samples was determined by measuring the dilution of the interferon samples which was capable of protecting 50% of the cells in culture against viral infection. This assay was compared with an identical assay in which cell destruction by virus was measured optically rather than by enzyme release.

The conditions of the cell incubation were similar to those described before except that Vero cells were infected by Sindbis virus. GOT was assayed as described above. Increasing dilutions of interferon-containing samples were tested for their ability to prevent viral infection of the cells.

Figure 4:
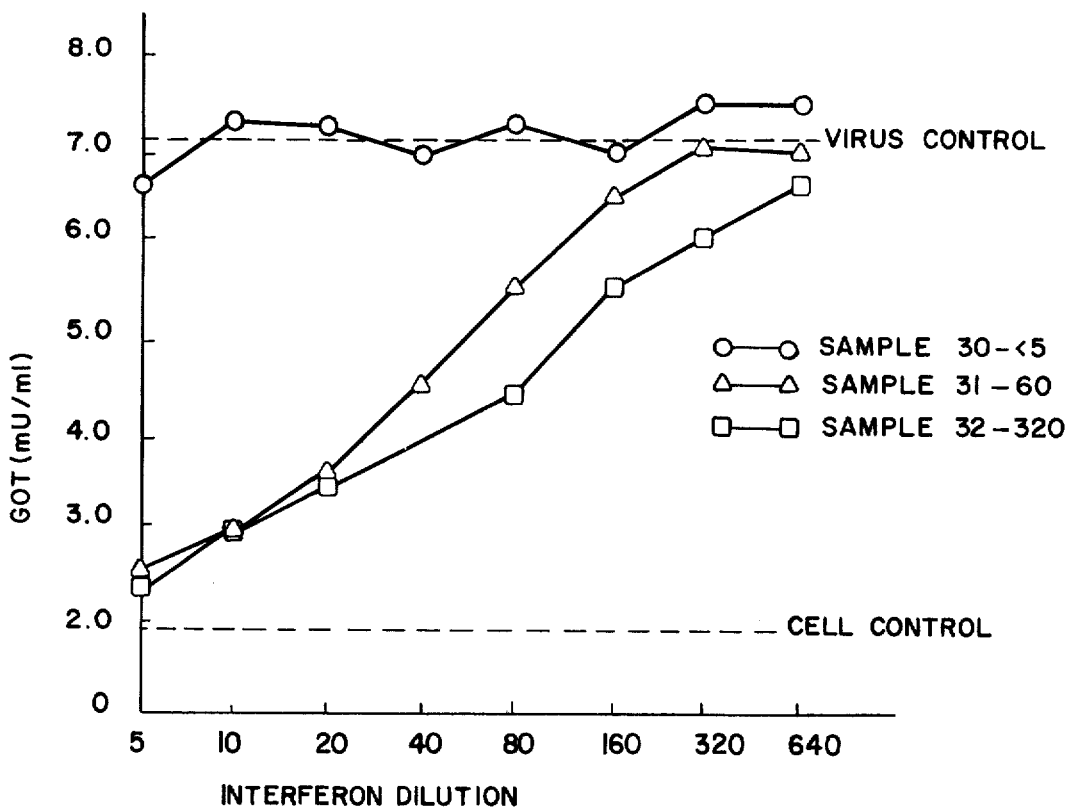

The results of these assays are shown in FIG. 4. Sample 30 contained no detectable interferon activity and samples 31 and 32 contained 70 and 160 units/ml., respectively. When cell destruction was measured optically, the interferon activity of samples 31 and 32 was found to be 60 and 320 units/ml., respectively. The tests, therefore, show a good comparability in the light of the uncertainty of traditional interferon assays.

EXAMPLE 3

The interferon activity of samples was determined by measuring the dilution of the interferon samples which was capable of protecting 50% of the cells in culture against viral infection. This assay was compared with an identical assay in which virus multiplication was measured by plaque reduction rather than by enzyme release.

The conditions of the cell incubation were similar to those described before, except that mouse interferon was assayed in mouse L-cells infected by vesicular stomatitis virus (VSV). In this example, the destruction of cells was measured by the release of the enzyme lactic dehydrogenase (LDH) into the incubation medium. LDH was assayed using the commercially available SHINAD method.

Figure 5:
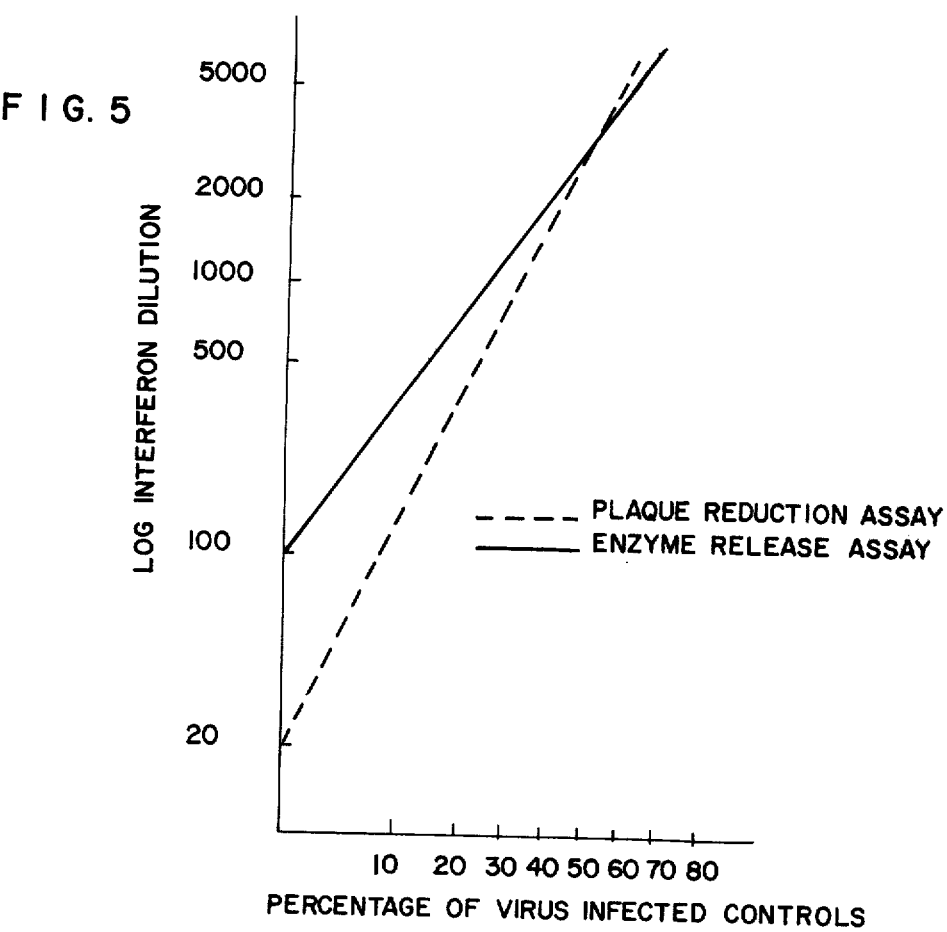

The results of these essays are shown in FIG. 5. It can be seen that the results of the enzyme release and plaque reduction assays both yielded interferon titers of 3000 units, demonstrating the parity of these techniques.

EXAMPLE 4

The interferon titre, i.e. that dilution of interferon at which 50% of the cells survive viral infection, was determined by measuring the LDH released as in Example 3.

Figure 6:
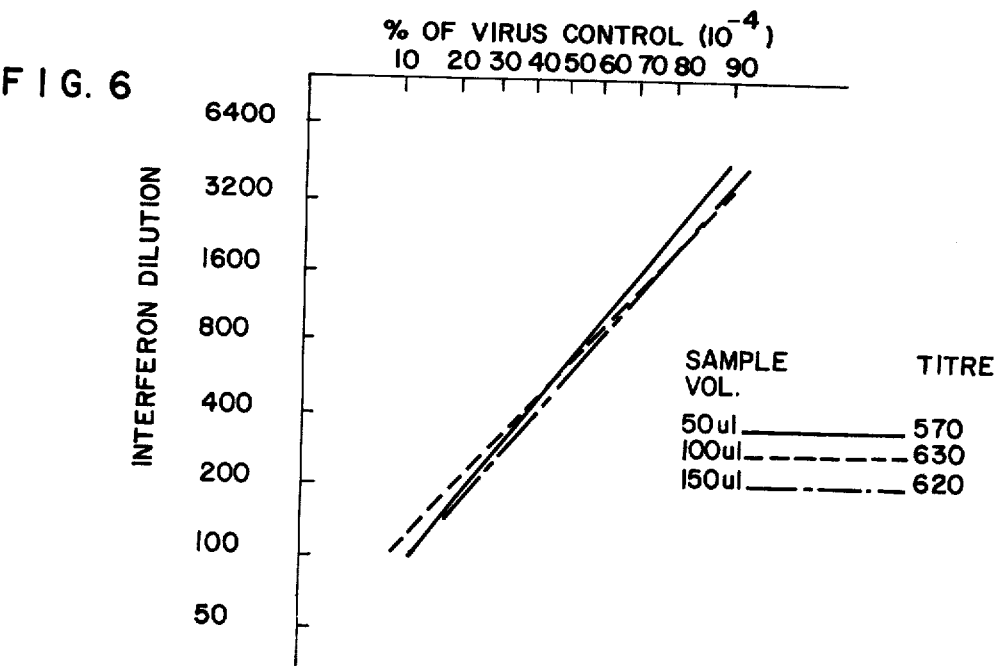

The conditions of the cell incubation were similar to those detailed before, except that human buffy coat interferon was assayed in primary Rhesus monkey kidney cells infected by VSV at a dilution of $10^{-4}$. The results of this experiment are depicted in FIG. 6 for the 100 $\mu$l. sample. The titre by plaque reduction was 638 units/ml. The two titres are within the limits achieved by repeated titration of a sample by conventional means.

EXAMPLE 5

When the process of Example 4 was repeated using a 50 $\mu$l. sample the titre obtained against VSV dilution of $10^{-4}$ is shown in FIG. 6 for the 50 $\mu$l. sample. The corresponding titre by plaque reduction was 638 units/ml. These results are within the limits achieved by repeated titration of a sample by conventional means.

EXAMPLE 6

When the process of Example 4 was repeated using a VSV dilution of $5 \times 10^{116-4}$ and a 50 $\mu$l. sample the titre obtained is shown in FIG. 7 for the 50 $\mu$l. sample. The corresponding titre by plaque reduction was 983 units/ml. These results are within the limits achieved by repeated titration of a sample of conventional means.

EXAMPLE 7

When the process of Example 6 was repeated using a 100 $\mu$l. sample the titre obtained is shown in FIG. 7 for the 100 $\mu$l. sample. The titre by plaque reduction was 983 units/ml. These results are within the limits achieved by repeated titration of a sample by conventional means.

What is claimed is:

1. A method for the determination of the activity of interferon which comprises infecting a host cell which is sensitive to interferon with a virus which is not an interferon inducer for said host cell in the presence of interferon and measuring the level of intracellular enzymes released.

2. A method for the determination of the activity of human interferon which comprises infecting human amnion (Wish) cells with Semliki Forest Virus in the presence of human interferon and measuring the level of glutaric-oxaloacetic transaminase or lactic dehydrogenase released from said human amnion (Wish) cells.

3. A method for the determination of the activity of interferon which comprises infecting Rhesus monkey kidney cells with Vesicular Stomatitis Virus in the presence of interferon and measuring the level of lactic dehydrogenase or glutaric-oxaloacetic transaminase released from said Rhesus monkey kidney cells.

4. A method for the determination of interferon activity which comprises infecting Vero cells with Sindbis virus in the presence of interferon and measuring the level of lactic dehydrogenase or glutaric-oxaloacetic transaminase released from said Vero cells.

5. A method for the determination of interferon activity which comprises infecting Mouse L cells with Vesicular Stomatitis Virus in the presence of interferon and measuring the level of lactic dehydrogenase or glutaric-oxaloacetic transaminase released from said Mouse L cells.

* * * * *